United States Patent [19]

Herringshaw et al.

[11] Patent Number: 4,800,638

[45] Date of Patent: Jan. 31, 1989

[54] METHOD OF MOUNTING AN OUTER SKIN TO AN INNER PANEL OF A VEHICLE DOOR

[75] Inventors: Steven D. Herringshaw, Mt. Clemens; Robert J. Szefi, Troy, both of Mich.

[73] Assignee: The Budd Company, Troy, Mich.

[21] Appl. No.: 89,305

[22] Filed: Aug. 25, 1987

[51] Int. Cl.⁴ .................................................. B23Q 17/00
[52] U.S. Cl. ........................................ 29/407; 29/434; 29/469; 29/464; 29/525.1; 49/502; 296/146
[58] Field of Search ............. 29/407, 434, 464, 526 R; 249/502, 503; 296/146

[56] References Cited

U.S. PATENT DOCUMENTS

| | | |
|---|---|---|
| 2,658,790 | 11/1953 | Fish et al. . |
| 2,707,320 | 5/1955 | Fish . |
| 2,972,386 | 2/1961 | Tanke .......................... 29/464 U X |
| 3,566,817 | 3/1971 | De Castelet . |
| 3,601,883 | 8/1971 | Arlauskas ........................ 29/407 X |
| 3,713,203 | 1/1973 | Fanslow ........................... 29/464 X |
| 3,782,036 | 1/1974 | Clark et al. . |
| 3,938,238 | 2/1976 | Kershaw et al. ................... 29/464 X |
| 4,090,734 | 5/1978 | Inami et al. . |
| 4,186,476 | 2/1980 | Mair et al. ........................ 29/464 X |
| 4,306,381 | 12/1981 | Presto . |
| 4,307,911 | 12/1981 | Pavlik . |
| 4,328,642 | 5/1982 | Presto . |
| 4,354,566 | 10/1982 | Yuda .............................. 29/464 X |
| 4,375,716 | 3/1983 | Armstrong et al. ............... 29/434 X |
| 4,405,173 | 9/1983 | Piano . |
| 4,416,088 | 11/1983 | Feucht et al. . |
| 4,494,337 | 1/1985 | Watanabe et al. . |
| 4,505,511 | 3/1985 | Hanle et al. . |
| 4,512,240 | 4/1985 | Mahler et al. . |
| 4,529,244 | 7/1985 | Zaydel . |
| 4,575,138 | 3/1986 | Nakamura et al. . |
| 4,593,494 | 6/1986 | Ono et al. . |
| 4,597,153 | 7/1986 | Zaydel . |
| 4,601,091 | 7/1986 | Grimm et al. .................... 29/464 X |
| 4,603,894 | 8/1986 | Osenkowski . |
| 4,606,148 | 8/1986 | Gandini . |
| 4,608,779 | 9/1986 | Maeda et al. . |
| 4,616,445 | 10/1986 | Watanabe et al. . |
| 4,617,712 | 10/1986 | Streett ............................ 29/434 X |
| 4,631,865 | 12/1986 | Motonami et al. . |
| 4,712,287 | 12/1987 | Johnston ............................ 29/469 |

FOREIGN PATENT DOCUMENTS 2236678 2/1975 France .
55-8927 1/1980 Japan .

Primary Examiner—Charlie T. Moon
Attorney, Agent, or Firm—Harness, Dickey & Pierce

[57] ABSTRACT

A vehicle door includes a module to which the door hardware can be attached and tested off line prior to shipment to the vehicle manufacturer.

9 Claims, 3 Drawing Sheets

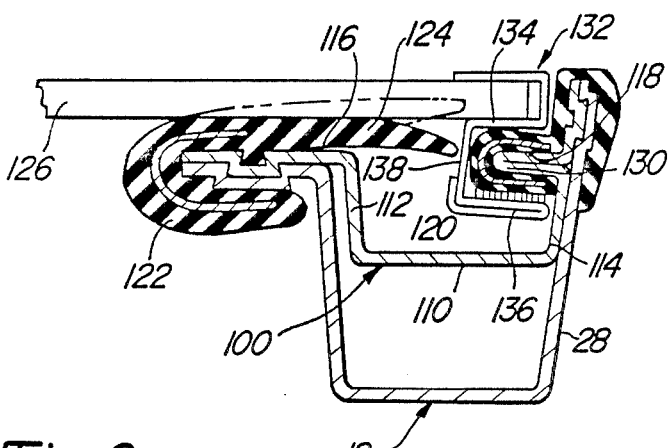
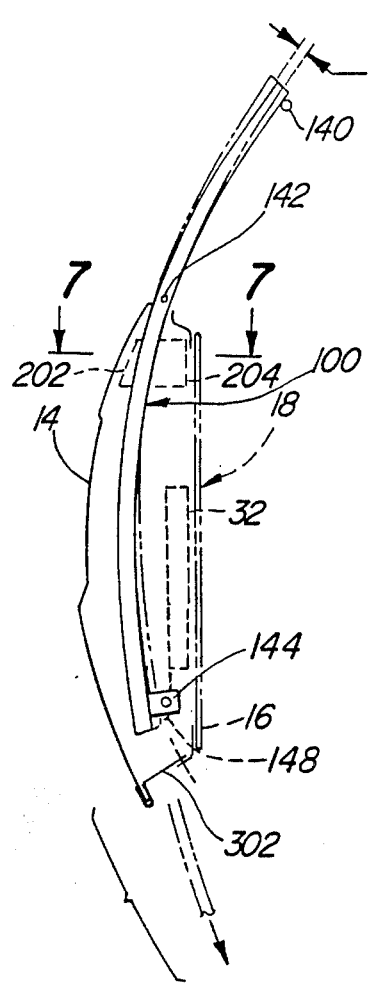
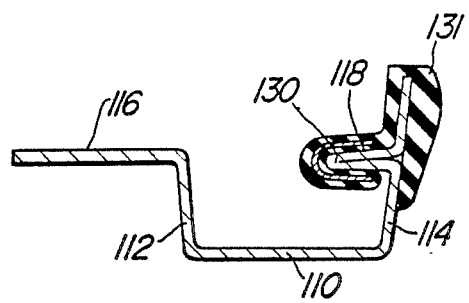
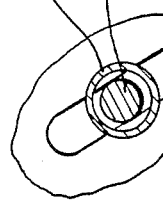
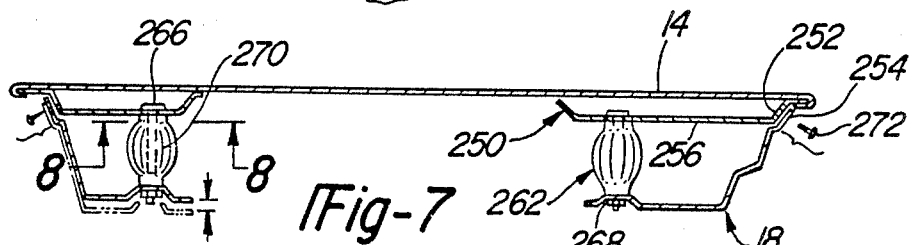
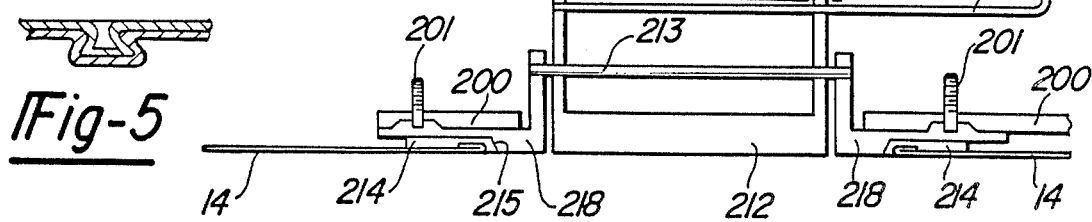

METHOD OF MOUNTING AN OUTER SKIN TO AN INNER PANEL OF A VEHICLE DOOR

1. Technical Field

This invention relates to vehicles and, more particularly, to doors for land vehicles.

2. Discussion

Conventional vehicle doors have been generally constructed on a piecemeal basis at sequential stages during an on-line assembly process. The main door unit usually includes a relatively thin (on the order of 0.030 inch) metal stamping forming an inner panel. A crash-resistant bar generally referred to as an intrusion beam is welded to longitudinally-extending flange portions of the inner panel. The cosmetic outer panel or skin is hemmed around the marginal edges of the inner panel. The lower portion of the main door unit has a hollow lower cavity and the inner panel in this area includes a plurality of access openings.

It is usually necessary to reinforce the inner panel, for example, along the sides thereof where hinges are mounted. The main door unit is hung on the vehicle body about these hinges and can be painted simultaneously with the rest of the vehicle.

Door hardware including the window regulator unit and door latching mechanisms are attached to the inner panel by workers who must manipulate these components through the access openings in the inner panel. After the door is completed, it is then usually tested to ensure that the window and door locks are operating properly.

There are several problems associated with the conventional approach. It is a time-consuming and, at best, awkward task to require the worker to assemble the door hardware through the relatively small access openings in the inner panel. Consequently, it is not uncommon for improper installation to result. Unfortunately, it is only possible to do the final testing of the window and door locks after the door has been painted and all of the labor intensive operations of assembling the door have been completed. If repair becomes necessary, it remains a tedious process to remove and replace the components since access to the door hardware must again be made by removing the interior trim panel and manipulating the components through the access openings in the inner panel. There is no access from the exterior of the vehicle since the outer panel is permanently affixed to the inner panel.

The conventional door construction also tends to be relatively heavy and requires many different operations to complete it. In addition to those steps noted above, it is usually necessary to use heavy steel reinforcement plates to add strength to the relatively thin inner panel. This increases weight and manufacturing costs. It is also sometimes difficult to meet assembly tolerances since the door hardware components are mounted to the inner panel with a multiplicity of parts such as brackets and the like. It is recognized that it becomes more difficult to meet the overall tolerance for the completed assembly when more parts are used, not to mention inventory overhead and other problems associated with the use of many parts.

The glass track in which the door window glass rides often has a channel section half of which is located on the exterior side of the glass. As a result, it is not possible for the glass to lie flush with the rest of the vehicle body and such flushness may be cosmetically advantageous for some vehicle designs. In addition, typical glass track constructions often do not provide any significant range of adjustment. In fact, it is often commonplace for the manufacturer or dealer to employ a brute force approach using lumber as a lever to bend the glass track and inner panel into proper alignment with the rest of the vehicle body. Of course, this approach is inconsistent, labor intensive and can cause damage to structural and other components within the door.

One of the most important aspects of door assembly is to have it properly aligned with the surrounding vehicle body. Unfortunately, conventional door constructions only provide a very limited range of adjustments. This is generally provided by the hinges on the door. Often, the hinges are not easily accessible and do not provide the necessary range of adjustments in all directions. In any event, the hinge adjustments are relatively time-consuming trial and error procedures.

The present invention is directed to solving one or more of these problems.

SUMMARY OF THE INVENTION

According to the teachings of the preferred embodiment of this invention, a modular door is formed of an inner panel made up of leg portions providing a peripheral frame conforming to a door opening in the vehicle. An intrusion beam is fixed to opposite legs of the inner panel adjacent the inner side thereof and carries operating hardware for operating various components associated with the door. The door hinge assemblies and door latch portion associated with the door are secured to the inner panel and intrusion beam so that impact loads are transmitted to the vehicle body.

The window is carried in a window track member nested in the inner panel adjacent the outer side thereof. Suitable guide means are provided adjacent the outer side of the inner panel for guiding the opening and closing movement of the window. With this arrangement the window is substantially flush with the outer skin of the vehicle body.

The window track member is more rigid than the inner panel and is initially mounted in the inner panel to pivot slightly about an axis through the belt line. Thus, the inner panel can be adjusted relative to the vehicle body to provide a tight fit with the seal therebetween by pivoting the upper portion of the window track member and thus the inner panel. After the adjustment, the lower portion of the window track member is fixed in place.

According to other teachings of the preferred embodiment of this invention, the door latching means including a handle is entirely attached to the inner panel so that the door latching hardware can be assembled and tested off line prior to attaching an outer panel to the inner panel. The outer panel has an opening aligned with the door handle to provide the user with access to the handle after the outer panel has been attached to the inner panel.

Preferably, the door latching hardware is assembled to a module which contains most of the door components except for the outer panel and inner trim panel. In such manner, off line testing of all of the door components can be accomplished and the module easily mounted during conventional on line assembly. Among the additional advantages of this invention is that the door hardware can be attached to the inner panel quite easily since it is no longer necessary for the worker to manipulate individual components through access openings in the inner panel as was done in the past. As noted above, final testing of the door hardware can be accomplished off line and before the outer panel is attached. Consequently, replacement of parts can be done easily if this becomes necessary. If repair is required after the vehicle has been shipped from the factory, access to the door hardware components is still easily obtainable by removing the outer panel. Work on the door hardware can be done from the exterior of the vehicle thereby even further facilitating the process.

According to another feature of this invention, a technique is provided for mounting the outer skin to the inner panel of the vehicle door. A mounting plate is attached to the interior perimeter of the outer skin, the mounting plate having a plurality of shanked fasteners protruding inwardly therefrom. The skin/mounting plate subassembly is brought into general alignment with the inner panel which has already been mounted to the vehicle. The shanks of the fasteners are inserted through elongated slots formed in the inner panel. Then, the skin/mounting plate subassembly is brought into precise alignment with adjacent vehicle body portions. The outer skin is maintained in this precise alignment location by fixing the positions of the fasteners relative to the inner panel from within the interior of the vehicle while the door is shut.

Still other features of this invention are directed to a door construction in which the window glass can be easily slid out of the bottom of the door for purposes of repair or replacement.

BRIEF DESCRIPTION OF THE DRAWINGS

Various other advantages of this invention shall become apparent to those skilled in the art upon reading the following specification and by reference to the drawings in which:

FIG. 5 is a partial cross sectional view taken along the lines 5—5 of FIG. 1 which illustrates a preferred method of connecting sheet metal parts;

FIG. 6 is a simplified cross sectional view taken along the lines 6—6 of FIG. 1 which illustrates the glass track adjustment technique according to the present invention;

FIG. 7 is a partial cross sectional view taken along the lines 7—7 of FIG. 6 which illustrates the method of adjusting the outer panel relative to the rest of the door in accordance with the teachings of this invention;

FIG. 8 is a cross sectional view taken along the lines 8—8 of FIG. 7;

FIG. 9 is a partial cross sectional view taken along the lines 9—9 of FIG. 1 which shows the window glass track and seals above the belt line of the door;

FIG. 10 is a partial cross sectional view taken along the lines 10—10 of FIG. 1 which shows the window glass track and seals below the belt line; and FIG. 11 is a partial cross sectional view taken along the lines 11—11 of FIG. 1.

DESCRIPTION OF THE PREFERRED EMBODIMENT

A. Overview

Figure 1:
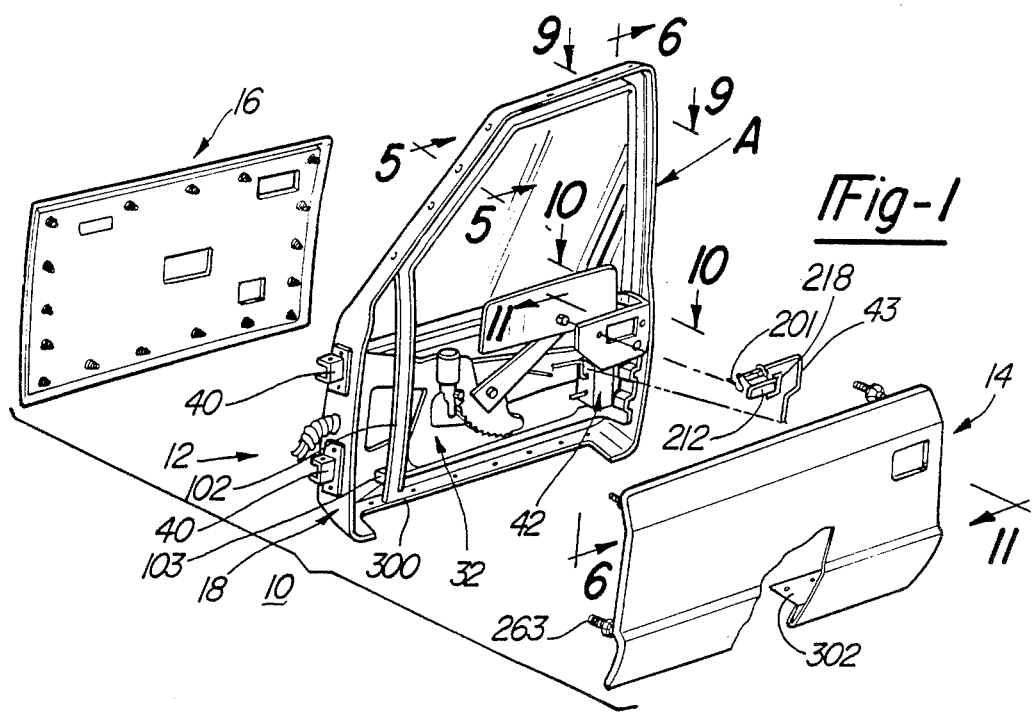
FIG. 1 is an exploded perspective view of a door made in accordance with the teachings of the present invention.

The door 10 made in accordance with the teachings of the preferred embodiment of this invention includes three main parts: a main door module 12, an outer skin or panel 14 and an inner trim panel 16 as can be seen most clearly in FIG. 1. Much of the focus of this invention is directed to the door module 12. Door module 12 consists of an integral unit to which all of the window regulator and door latching hardware has been attached. As will appear, the attachment and testing of the door hardware can be performed easily off-line before shipping the module to the vehicle manufacturer. It is envisioned that the vehicle manufacturer will paint the outer skin 14 simultaneously with the rest of the car, then attach door module 12 to the body and, finally, attach the outer panel 14 and interior trim pad or panel 16.

The following sections will describe the construction and assembly of the door 10 in more detail.

(1) Intrusion Beam and Hardware and Electrical Control Attachment

The main door module 12 includes an inner panel 18 in the form of a relatively thin (about 0.030 inch) sheet metal stamping defining a shape corresponding to that of the door opening in the vehicle with which it will be used. In the embodiment disclosed herein the frame defines a lower generally rectangular portion which accommodates the outer panel 14 and inner trim panel 16 and further defines a generally trapezoidal upper portion that receives a window 126, its associated track and seals. The intersection of the upper and lower portions of the frame is generally referred to as the belt line. Below the belt line, the inner panel 18 includes front and rear lower leg portions 20 and 22 (alternatively referred to as laterally-extending side walls) connected by a bottom leg portion 24. The leg portions 20 and 22 have a generally L-shaped cross section. One leg of the L-shaped extends adjacent the inner trim panel 16 and generally parallel to the axis of the vehicle (this leg is alternatively referred to herein as a longitudinally-extending peripheral face) and the other leg extends generally transverse to that axis and terminates adjacent the outer skin 14. Thus, the frame has a free edge adjacent the outer skin 14 and an edge where the legs intersect adjacent the inner trim panel 16. In use, the front lower leg portion 20 is adjacent the front door post (the A post) of the vehicle, the rear lower leg portion 22 is adjacent the rear door post (the B post) of the vehicle and the bottom leg portion 24 is adjacent the bottom sill of the vehicle.

At the upper edge of the front lower leg portion 20, the metal stamping is bent at an angle so that it forms an upper front leg portion 26 extending toward the rear door post of the vehicle; at the upper edge of the rear lower leg portion 22 the metal stamping extends upwardly forming an upper rear leg portion 28. The upper leg portions 26 and 28 are connected by a top leg portion 30 (see, e.g. FIG. 3). The leg portions 26, 28 and 30 are generally U-shaped in cross section and include a connecting leg generally parallel to the longitudinally-extending peripheral face of the lower leg portions and a pair of legs extending therefrom in the same direction as the transverse leg of the lower leg portions.

An intrusion beam 32 is provided for reinforcing the door and absorbing impact forces in the event of a collision. The intrusion beam in accordance with this invention is a generally trapezoidal-shaped member in plan view and is formed by a relatively rigid sheet metal web 34 formed with a front flange 36 and a rear flange 38. The web tapers from a larger dimension adjacent the front flange 36 to a smaller dimension adjacent the rear flange 38 so that the front flange is longer than the rear flange. Various openings are formed in the web 34 to provide a weight reduction benefit or to accommodate any radio speakers or other components located in the door.

The intrusion beam 32 can be secured to the inner panel 12 from the open side, i.e., the side that is to be adjacent the outer skin 14 and free edge. The front flange 36 is secured to the transverse leg of the front lower leg portion 20 and the rear flange 38 is secured to the transverse leg of rear lower leg portion 22. Securing the flanges 36 and 38 to the leg portions 20 and 22 can be accomplished by any suitable fastening means and in the preferred embodiment disclosed herein it is accomplished by a system know as TOG-L-LOC (a trademark of BTM Corp. of Marysville, MI) which is shown in FIG. 5 and where the sheet metal is punched into conforming engagement.

When the intrusion beam 32 is secured to the inner panel 18, the web 34 extends across the lower generally rectangular opening 35 defined by the frame and is closer to the inner edge where the legs of the L-shaped frame intersect than it is to the outer or free edge. In other words, the web 34 is adjacent the longitudinally-extending peripheral face of the leg portions 20, 22 and the inner trim panel 16. This contrasts with conventional arrangements where the intrusion beam is adjacent the outer skin 14. In order to comply with Motor Vehicle Safety Standard No. 214 (49 CFR 571.21) the intrusion beam 32 should be stronger than conventional beams because it will be located farther from the outer skin 14 than usual.

Figure 3:
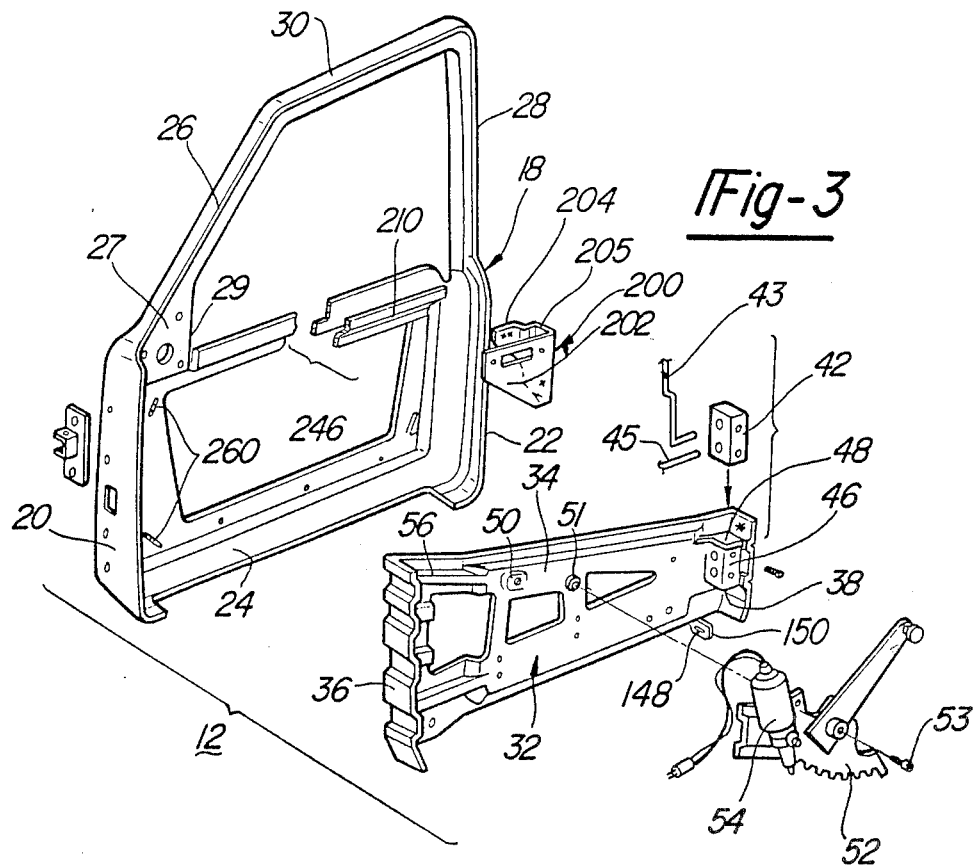
FIG. 3 is an exploded perspective view of the door module with the exception of the window subassembly.

The inner panel 18 is provided with parts of door hinge assemblies 40,40 and with parts of a door latch assembly 42. In order to transmit impact loads to the A and B posts of the vehicle body, the door hinge assemblies 40, 40 should be attached to the front lower leg portion 20 adjacent the front flange 36 so that it is connected to both the inner panel 18 and the intrusion beam 32. When the door is mounted in the vehicle, the hinge assemblies 40, 40 will cooperate with mating hinge assemblies on the A post. Impact loads will be transmitted through the intrusion beam 32, the hinge assemblies 40, 40 and their mating hinge assemblies to the A post. Similarly, the door latch assembly 42 carried by the door cooperates with a mating door latch assembly carried on the B post of the vehicle. To transmit forces, the door latch assembly 42 is secured to the rear flange 38 of the intrusion beam 32 to transmit impact forces to the B post of the vehicle body. As best seen in FIG. 3, portions 44 and 46 of the web 34 and the rear flange 38, respectively, are struck out to define an opening 48 into which the door latch assembly 42 is inserted. The door latch assembly 42 is illustrated as a box in which the latching mechanism is enclosed and it is fixed to the web portion 44 and rear flange portion 46 by suitable fasteners. The drawing also illustrates outer and inner links 43, 45 connecting latch assembly 42 to an outer handle 212 and an inner handle (not shown), respectively. Wiring (not shown) for operating door locks in the event the door is equipped with power locks may also be provided.

With the web 34 located adjacent the inner trim panel 16, the intrusion beam 32 can carry operating hardware associated with the doors in an advantageous modular arrangement. The web 34 is formed with suitable openings 50 and 51 used to receive fasteners (e.g. 53) and secure the window drive sector 52 and the electric motor 54, respectively, to the intrusion beam 32. The window drive sector is a conventional arrangement used to open and close the window 126 of the door. The electric motor 54 drives the sector to regulate the window, but it should be understood that the motor could be replaced by a manually operable crank assembly. An electrical control panel for operating power windows, door locks, mirrors, etc. can also be accommodated on the intrusion beam 32. To this end, the web 34 is formed with an offset tray 56 projecting from the face of the web adjacent the inner trim panel 16. The electrical control panel (not shown) is secured to the bottom surface of the tray 56 and the inner trim panel 16 includes upholstery or other decor covering the metal forming the tray 56. Finally, the inner door handle (not shown) is attached to the web 38 so that all operating hardware is attached to the intrusion beam 32.

A wire harness 58 is also associated with the door module 12 for connecting all electrical equipment in the door to the wire harness of the vehicle and thus to an energy source in the vehicle. As is conventional the wire harness 58 fits through an opening in the front lower leg portion 20. It includes suitable connectors for making electrical connections to the electrical equipment.

The window and its associated guide and seals and the outside handle and housing are also assembled to the inner door panel and will be described hereinafter. In addition, the outer skin 14 and inner trim panel 16 are attached and will be described hereinafter.

(2) Window, Track and Seal

FIGS. 1, 4, 9 and 10 most clearly illustrate the window, track and seal assemblies which are arranged to provide for the nearly flush mounting of the window 126 relative to the outer skin 14 and the adjacent side of the vehicle body. The arrangement includes a glass track 100 formed of a relatively rigid metal member (more rigid than the inner panel 18) bent to a shape so that it can be tightly nested into engagement with the inner panel 18. Thus, the window track 100 has front and rear lower leg portions 102 and 104 corresponding to leg portions 20 and 22, front and rear upper leg portions 106 and 108 corresponding to leg portions 26 and 28 and a top leg portion 110 corresponding to top leg portion 30. It does, however, have an open side adjacent the bottom leg portion 24 of the inner panel 18. When the window track member 100 is nested in the inner panel 18, the legs 106, 108 and 110 engage with the legs 26, 28 and 30. In this embodiment, the inner panel 18 includes a mirror mounting gusset 27 at the intersection of the leg portions 20 and 26. Thus, the leg portion 102 does not engage with leg 20 but extends along a line generally coincident with the inner or free edge 29 of the mirror mounting gusset 27. This is because the window 126 does not extend across the gusset 27, but terminates at the free edge 29 as seen most clearly in FIG. 1. Of course, the leg 106 of the window track member 100 is shorter than its corresponding leg 26 of the inner panel 18. The lower end of track leg 102 is provided with a bracket 103 that is fixed to the inner panel 18 at about point 105 shown in FIG. 4.

The leg portions 102, 104, 106, 108 and 110 are somewhat U-shaped in cross section with the connecting leg thereof being adjacent the connecting leg of the generally U-shaped leg portions 26, 28 and 30 and also the longitudinally-extending peripheral face of the L-shaped leg portions 20, 22 and 24. The outer one of the generally parallel legs of the U-shaped cross section are adjacent the transverse leg of the L-shaped frame. The glass track 100 is nested in the inner panel 18 as seen in FIGS. 1 and 9 with the open side of its cross section facing the outer skin 14 of the door.

Figure 4:
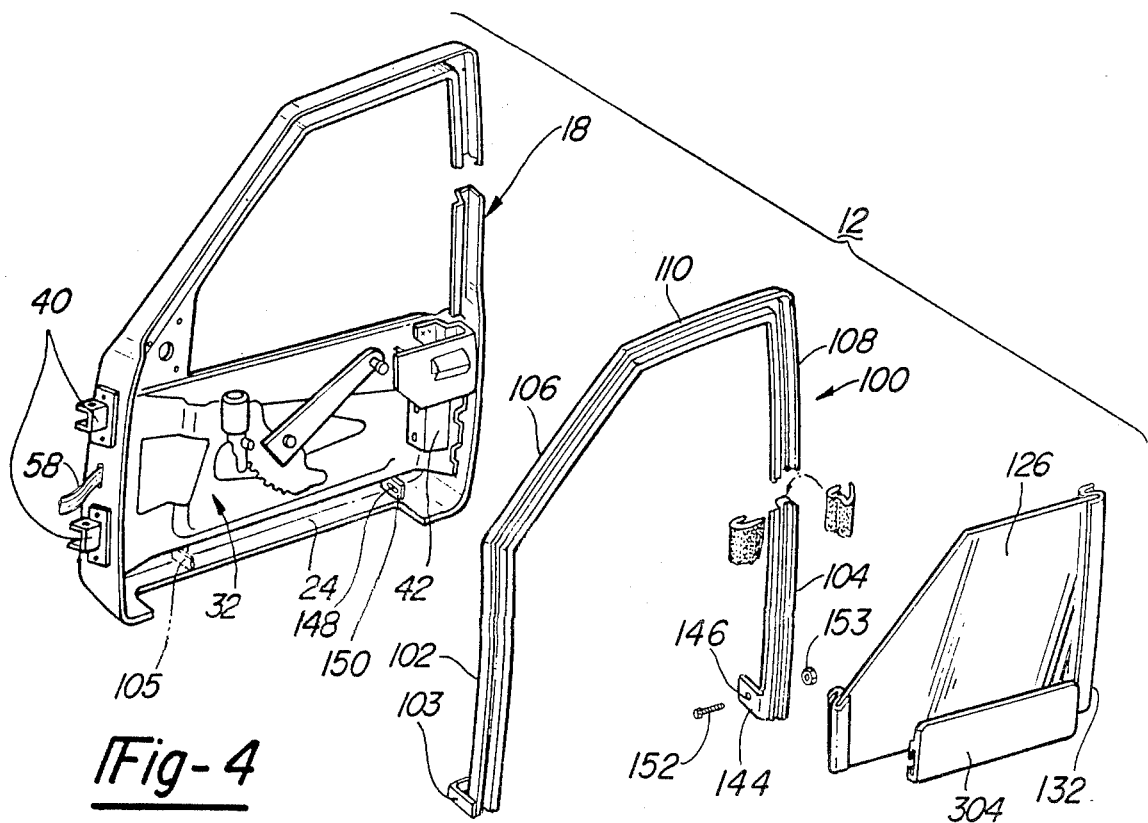
FIG. 4 is an exploded perspective view including the window subassembly.

As noted the cross section of the legs is somewhat U-shaped and is thus shown in FIG. 4 for the sake of clarity. The actual shape of leg portions 102 and 104 are the same and are most clearly illustrated in FIGS. 9 and 10. These leg portions are formed with a back wall 110 and a pair of parallel side walls 112, 114. The back wall 110 is spaced from the connecting wall of the generally U-shaped leg portion 28. At an end remote from the back wall 110, side wall 114 is bent inwardly and then back on itself to form front wall 118 which cooperates with a front wall 116 formed at the remote end of side wall 112 so as to define an opening 120. The front wall 116 is fastened to the leg portions 26, 28 and 30 of the inner panel 18 by way of the TOG-L-LOC connections to hold the glass track 100 to the upper leg portions of the frame 18. A portion of side wall 114 extending beyond the front wall 118 is similarly fixed to the leg portions 26 and 28. As will appear, the lower rear leg 104 of glass track 100 is not permanently fixed to allow a range of adjustment which will be described later herein.

A seal member 122 is attached to the glass track 100 and the inner frame 18. The seal member 122 is made of molded rubber and wraps around the ends of side wall portions of the leg portion 28 and the front wall 116 of the track 100. A sealing finger 124 also integrally formed as part of the seal member is biased as shown in dotted lines in FIG. 9 to bear on the inner surface of the glass window 126. As shown in FIG. 10, the seal member 122 does not extend below the belt line.

Still referring to FIGS. 9 and 10, the edges of the window 126 adjacent the A and B posts carry a clip member 132 which is formed with a pair of spaced apart legs 134, 136 connected by a leg 138. The leg 134 bears on the interior surface of the window 126 and the leg 136, also located on the inside of the window 126, is spaced from it by the leg 138 to form a track. The reversely bent front wall portion 118 of glass track 100, which is covered by a seal 131, extends between the legs 134 and 136 and these members cooperate to guide the windows' movement between the open and closed position. The front wall portion thus functions as a guide rail. Preferably conventional cushion members are adhesively secured to the leg 136.

Because the intrusion beam is adjacent the inner trim panel 16, the front wall or guide rail 118 can be located adjacent the outer skin 14. In this way the guide means between the window track 100 and the window 126 can be arranged so that the window extends beyond the free edge of the inner panel 18 to locate the window so that it is almost flush with the outer skin 14. No part of the guide means (guide rail 118 and the track formed between walls 134 and 136) extends around the exterior surface of the window 126.

(3) Outside Handle Housing and Mounting

As shown best in FIGS. 3 and 11, a stamped sheet metal housing 200 is fastened to inner panel 18 so that the outer face 202 thereof is substantially adjacent the free or outer end of frame leg 22. In the preferred embodiment, housing 200 is essentially U-shaped having a rear wall 204 running parallel to outer face 202. A transverse connecting portion 206 bridges rear wall 204 with outer face 202. Wall 204 and connecting portion 206 are fastened to belt line reenforcement member 210 and to leg 22 of inner panel 18 as by the TOG-L-LOC system noted above.

A handle assembly includes an outer bezel 218 mounted to the outer face 202 of housing 200 by fasteners 201 as seen in FIG. 11. The assembly has a pivoting handle 212 connected to link 43 and pivotally mounted to pin 213 which creates sufficient movement in link 43 when the handle 212 is lifted to cause the latch assembly 42 to release. The outer skin 142 has an aligned opening 215 provided with a suitable seal 214 that allows the user to access handle 212 when the door is fully assembled.

(4) Window Track Adjustment

Turning now to FIGS. 3, 4 and 6, the glass or window track 100 is arranged to be adjusted during its assembly and even afterward so that the body seal, i.e., the seal 140 between the inner periphery of the inner panel 12 and the door opening in the vehicle body, can be adjusted to assure a tight fit. Such a tight fit is important to reduce noise when the car is in motion and also, of course, to prevent water leakage.

As shown in FIG. 6, the seal 140 runs around the inner periphery of the leg portions 20, 22, 24, 26, 28 and 30. Seal 140 can be fixed to either the door or the door frame. It is usually in the form of a hollow soft rubber member and is compressed between the door and the vehicle body when the door is closed. It is desirable to be able to provide for slight adjustment between the door and vehicle body to assure a tight fit. This is particularly important in the interface between the door and vehicle body adjacent the window 126. Here adjustments on the order of about 0.04 to about 0.08 of a inch can assure an air tight interface and reduce air noise in the vehicle passenger compartment.

To provide such adjustability, the window track 100 is mounted to the inner panel 18 so that the track can be pivoted to or away from the vehicle body (the side of the inner panel 18 adjacent the inner trim panel 16) just enough to adjust the fit between the upper portions of the door module 12 and the vehicle body. The upper portions of window track 100 is placed inside the inner panel 18 and are permanently secured thereto by suitable fasteners, the lowermost of which is shown at 142. Generally, this connection is made at the belt line of the door—at or just below the intersection of leg portions 20 and 26, 102 and 106, 22 and 28, 104 and 108. The connection can be made by the same means illustrated in FIG. 5 or any other means which will allow some rotation of the window track 100 about the fastener 142. The lower end of track leg 102 is similarly fixed to panel 18 via stand off bracket 103. Leg 104, however, is adjustable as will appear so that it can lock the upper door portions in place.

Once the window track 100 and inner panel 18 are so fastened, the leg portions 106, 108 and 110 of the window track 100 can be pivoted about the connection point 142 either toward or away from the vehicle body (see ADJ. in FIG. 6). The window track 100 is more rigid than the inner panel 18, and because of this the inner panel pivots with the window track and assumes the same orientation. This pivoting continues until the proper spacing between upper portions of the door and the vehicle body is obtained. For this purpose the bottom, free end of at least one of the lower track legs (here leg 104) is provided with a bracket 144 having a circular hole 146 which is aligned with a laterally extending slot 148 in a tab 150 depending from the intrusion beam 32. The threaded shank of a fastener 152 passes through the hole 146 in bracket 144 and slot 148 in tab 150 and is provided with a nut 153. The orientation of slot 148 permits the lower track leg 104 to move in/out laterally thereby pivoting the upper door portions until the desired adjustment with seal 140 is made. Then, the nut 153 is tightened to maintain the adjusted position of the door.

(5) Outer Skin Panel Adjustment

As can be seen most clearly in FIGS. 1, 3, 7 and 8, a mounting plate 250 is attached to the interior perimeter of the outer skin 14. Preferably, skin 14 is attached to plate 250 by way of folding over the marginal edges of the skin 14 as can be seen most clearly in FIG. 7. Plate 250 includes laterally extending side walls 252 which conforms in part to portions 254 of the side walls of the inner panel 18. Mounting plate 250 is constructed so that its longitudinally extending face 256 extends parallel to but is spaced from outer skin 14.

Mounting plate 250 includes a plurality of elongated slots 258 located about the four corners thereof. As can be seen most clearly in FIG. 3, inner panel 18 likewise includes a plurality of elongated slots 260 located about the four corners thereof in general alignment with the slots 258 in mounting plate 250. The slots 258 run in a generally transverse direction to the direction in which slots 260 run.

Threaded fasteners 262 are provided for each slot pair. Fasteners 262 each includes a threaded shank 264 and an enlarged head 266 located in the space between the plate face 256 and the door skin 14. The shanks 264 extend through the slots 260 in the inner panel 18 and are held in place by way of nuts 268.

Provision is made for pressing the outer skin 14 away from the inner panel 18 and in the disclosed embodiment, this is provided by way of compression springs 270 which surround the shank 264 of the fasteners 262. The compression springs can take many forms such as the bellows shape illustrated in the drawings.

Figure 2:
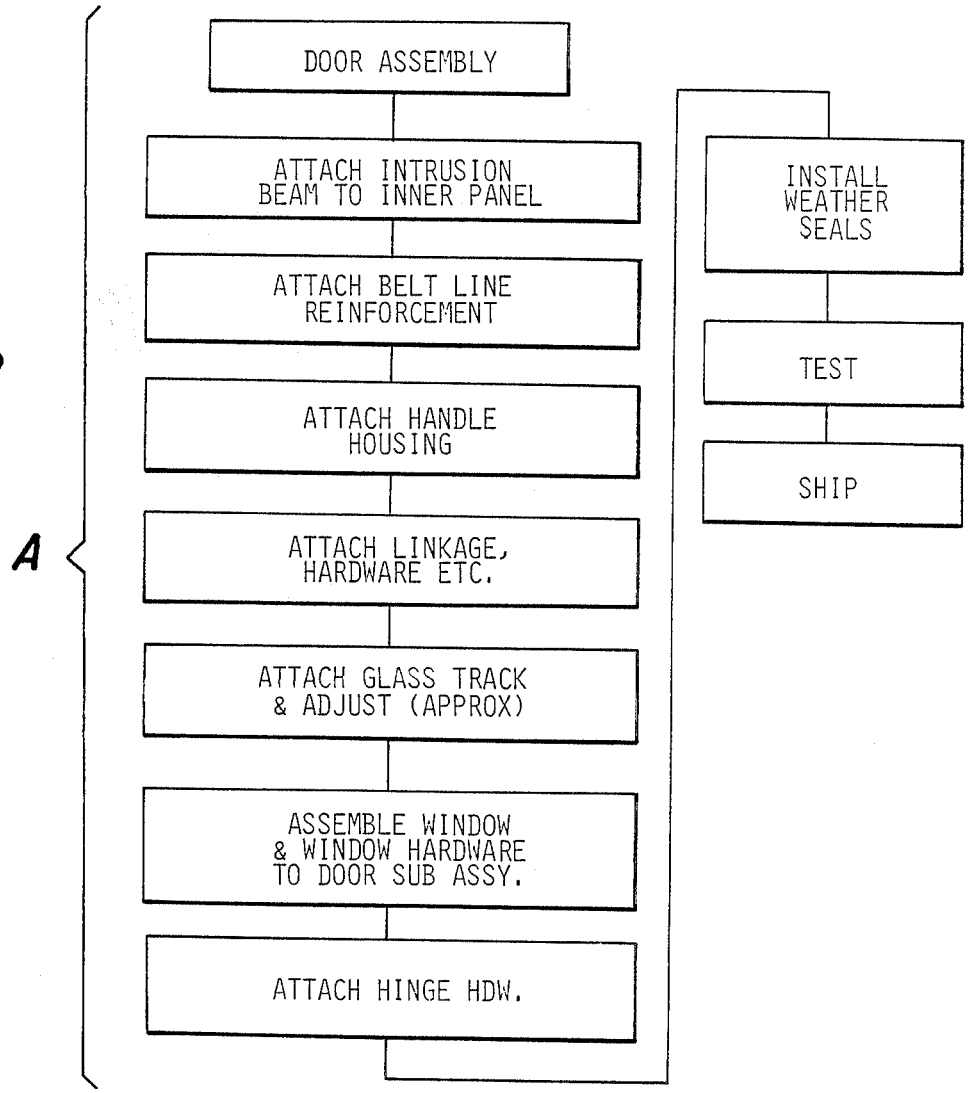
FIG. 2 is a flow chart illustrating the general steps carried out in making the door module designated with the reference letter A in FIG. 1.

In accordance with the method of this invention, the door module 12 is preassembled and shipped to the vehicle manufacturer as represented by the steps shown in FIG. 2. Likewise, the outer skin 14 is preassembled to its mounting plate 250 and shipped to the vehicle manufacturer. The skin 14 and vehicle are then painted. The vehicle manufacturer then attaches the door module 12 to the vehicle.

To attach the outer skin/mounting plate subassembly, it is brought into general alignment with the inner panel 18 which has already been mounted to the vehicle. The shanks of the fasteners 262 are inserted through the slots 260 in the inner panel 18. A worker from the exterior of the vehicle then manipulates the outer skin until it is brought into precise alignment with adjacent vehicle body portions while the door is shut. Then, the outer skin is secured in its precision alignment by tightening the nuts 268 from within the interior of the vehicle while the door remains shut. The configuration of the slots 258 and 260 allow for horizontal and vertical adjustment of the outer skin while the compression springs 270 provide a degree of in/out adjustment known in the trade as the "Z" direction. The compression springs 270 effectively initially serve as standoffs to cause the outer skin 14 to be spaced a given distance from the inner panel 18. By tightening the nuts 268 the springs 270 compress thereby allowing the operator to draw in the outer skin as necessary to bring it flush with the adjacent vehicle body portions.

After the outer skin adjustment has been completed, the door construction is finalized by inserting a plurality of perimeter screws 272 between the sides 254 of the inner panel 18 and sides 252 of mounting plate 250. Then, the inner trim panel 16 can be attached to the interior side of the door module 12.

(6) Window Glass Access from Bottom of the Door

With special reference to FIGS. 1 and 6, the lower leg 24 of the inner frame 18 includes a cutout portion 300. Cutout 300 has a width greater than the width of the window glass 126 and is generally aligned with the bottom of the glass track 100. Mounting plate 250 includes a lower lip 302 which extends inwardly and is dimensioned so that it is slightly larger than the dimensions of cutout 300. As a result, the lip 302 covers the cutout 300 when the outer skin/mounting plate subassembly is attached to the door module 12 as described above.

If it becomes necessary to repair or replace the window glass 126, it becomes an easy task to do so. Once the outer skin/mounting plate assembly has been removed from the door module 12, the window glass 126 and its carrier bracket 304 can be disconnected from sector drive 52 and slid downwardly along lower portions of glass track 100 and then out of cutout 300. A new window glass is easily replaced by reversing this procedure.

B. Summary

In view of the foregoing, it can now be appreciated that the modular door approach of the present invention provides significant advantages over conventional door structures. Among these advantages is that the major portions of the door can be assembled and tested off line in an efficient manner. Other features of this invention is that it provides the door with a significant range of adjustments necessary to provide a good fit. Still other advantages will become apparent to those skilled in the art after having the benefit of a study of the specification, drawings and following claims.

What is claimed is:

1. A method of mounting an outer skin to an inner panel of a vehicle door, said method comprising the steps of:
   (a) mounting the inner panel to the vehicle;
   (b) attaching a mounting plate to the interior perimeter of the outer skin, the mounting plate having a plurality of shanked fasteners protruding inwardly therefrom;
   (c) moving the skin/mounting plate subassembly into general alignment with the inner panel;
   (d) inserting the shanks of the fasteners through elongated slots formed in the inner panel;
   (e) moving the skin/mounting plate subassembly as necessary to bring the outer skin into precise alignment with adjacent vehicle body portions; and
   (f) securing the outer skin in its precise alignment location by fixing the positions of the fasteners relative to the inner panel.

2. The method of claim 1 wherein the fasteners are threaded and wherein step (f) comprises tightening a nut on the shanks of the fasteners.

3. The method of claim 1 which further comprises:

covering an interior side of the inner panel with a trim pad.

4. The method of claim 1 which further comprises:
preassembling an intrusion beam, door latching hardware, window glass and window regulator mechanisms onto the inner panel before it is mounted to the vehicle.

5. The method of claim 4 wherein said door latching hardware and window regulator mechanisms are tested off line before the inner panel is mounted to the vehicle.

6. The method of claim 1 wherein step (b) comprises: folding marginal edges of the outer skin around the periphery of the mounting plate.

7. The method of claim 1 which further comprises:
applying screws through side walls of the inner panel into adjacent side walls of the mounting plate.

8. The method of claim 4 wherein the inner panel is latched in its shut position during steps (c)–(e).

9. The method of claim 8 which further includes adjusting the compression on springs located between the mounting plate and inner panel to control inward/outward positioning of the skin.

* * * * *